Figure 1:
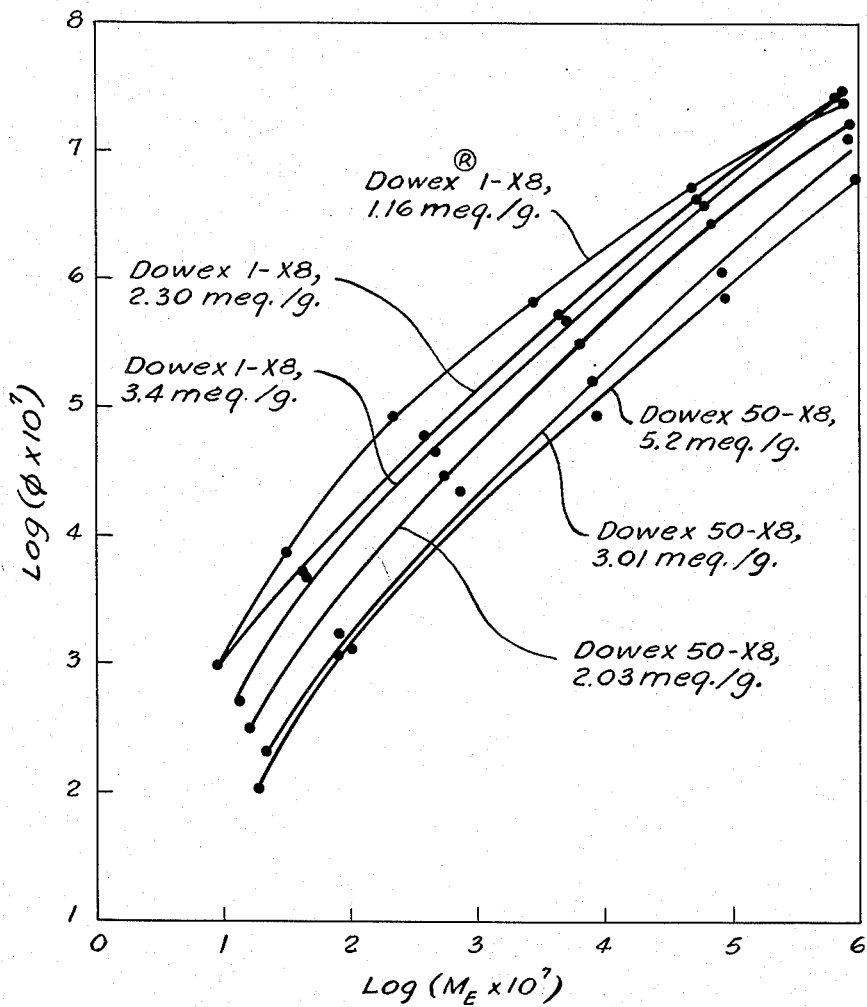

3,179,703
REMOVAL OF PHENOLS FROM THEIR AQUEOUS SOLUTIONS WITH LOW-CAPACITY ION-EXCHANGE RESINS
Caspar William Rieman III, New Brunswick, N.J., assignor to The Dow Chemical Company, Midland, Mich., a corporation of Delaware
Filed Sept. 20, 1960, Ser. No. 57,255
4 Claims. (Cl. 260—621)

This invention concerns a method for removing phenols from their aqueous solutions by means of molecular sorption with resins having low ion exchange capacity, both of the sulfonated cation exchange type and of the quaternary ammonium anion exchange type. More particularly, the invention concerns a method for removing phenols from streams and aqueous industrial wastes by passage through a water-immersed bed of a low-capacity quaternary ammonium anion exchange or a low-capacity sulfonated cation exchange resin.

It has been proposed in the past to remove a dissolved phenol from an aqueous solution by passage through a bed of a strongly basic quaternary ammonium anion exchange resin in its salt form. The dissolved phenol was sorbed by the strongly basic quaternary ammonium anion exchange resin and was thereby removed from its aqueous solution. The solution was drained or washed from the resin, after which the sorbed phenol was eluted from the resin by washing the same with a water-miscible organic liquid, e.g., methanol. This method used a conventional quaternary ammonium anion exchange resin in its salt form, e.g., the sulfate, chloride, nitrate or phenate form. Such conventional resins have from two-thirds to one functional quaternary ammonium group per aryl nucleus.

It has now been discovered that low-capacity salt form quaternary ammonium anion exchange resins and low-capacity acid or salt forms of sulfonated cation exchange resins having from 10 to 60 percent of the amount of functional groups as are present in conventional sulfonated or quaternary ammonium ion-exchange resins are particularly suitable for removing phenols from their aqueous solutions. Such low-capacity ion-exchange resins sorb phenols more tenaciously than the conventional quaternary ammonium anion exchange resins previously used.

The anion and cation exchange resins of this invention have from 10 to 60 percent as many quaternary ammonium anion exchanging or sulfonate cation exchanging groups as conventional quaternary ammonium or sulfonate ion-exchange resins. The low-capacity resins used in the process of this invention advantageously have their quaternary ammonium or sulfonate groups uniformly distributed throughout their resinous polymeric matrixes.

The low-capacity quaternary ammonium anion exchange resins used in the process of this invention are made by suspension polymerizing at about 20° to 50° C. vinylbenzyl chloride or bromide together with one or more other monoalkenyl aryl comonomers and a cross-linking dialkenyl monomer, suitably divinylbenzene, in proportions from 10 to 60 mole percent vinylbenzyl halide, 0.1 to 10 mole percent dialkenyl monomer, the balance being one or more monoalkenyl aryl monomers. Thereafter, the resulting particulate polymeric vinylbenzyl halide is reacted, advantageously at 20° to 100° C., with a tertiary amine of the type used in making conventional quaternary ammonium resins in amount sufficient and for a time sufficient to react with the benzylic halide groups to give the corresponding low-capacity uniformly distributed quaternary ammonium halide substituted resins. The course of the quaternization reaction to completion is followed by periodic capacity tests. The reaction product is advantageously washed with acetone and water. It is used in the salt form, e.g., sulfate, chloride, nitrate or phenate form.

The low-capacity sulfonated cation exchange resins used in the process of this invention are made by swelling a polymeric alkenylaromatic resin cross-linked with between 0.1 and 10 mole percent of a dialkenyl cross-linking agent, with a swelling agent which is also an inert solvent for chlorosulfonic acid, admixing chlorosulfonic acid in amount sufficient to monosulfonate from 10 to 60 percent of the available aryl nuclei, and gradually heating the mixture of swollen resin and chlorosulfonic acid to a sulfonation temperature of about −20° to 20° C. for a time sufficient uniformly to monosulfonate from 10 to 60 percent of the available aryl nuclei as determined by periodic capacity tests. The reaction product is washed with water. It is used in the acid or salt form, e.g., the hydrogen or sodium form.

In making the polymeric low-capacity anion and cation exchange resins used in this invention, conventional dialkenyl cross-linking agents in amount from 0.1 to 10 mole percent of the base or matrix resin polymer are used. They include divinylbenzenes, divinyltoluenes, divinylxylenes, divinyl naphthalenes, divinylethylbenzenes, diallyl esters, diacrylate esters, etc. Resinous alkenylaryl polymers which are subsequently sulfonated to give low-capacity cation exchange resins are advantageously those of styrene, vinyltoluenes, vinylxylenes, vinylnaphthalenes, vinylethylbenzenes, alpha-methylstyrene, vinylchlorobenzene, and mixtures thereof. The polymeric vinylbenzyl halides used to make the quaternary ammonium resins utilized herein are those containing the preceding monomers and mixtures thereof also containing from 10 to 60 mole percent combined vinylbenzyl chloride or bromide.

Phenols which can be removed from their aqueous solutions by the salt-form of water-wet low-capacity anion and the salt or acid form of cation exchange resins described above are the monohydric phenols, nuclearly substituted derivatives thereof containing one or more halo substituents such as chloro or bromo, or alkyl, aryl, aralkyl, cycloalkyl or alkoxy groups, all of which are directly attached to the aryl nucleus. Examples of phenols which can be sorbed from their aqueous solutions by the method herein described are phenol, o-, m-, and p-cresol, xylenol, chlorophenol, trichlorophenol, bromophenol, o-phenylphenol, p-tertiary-butylphenol, pentachlorophenol, guaiacol, ethylphenol, nitrophenol and carvacrol. Such phenols can be sorbed from their aqueous solutions containing as little as one p.p.m. phenol.

In practice, the water-wet low-capacity sulfonated cation exchange resin in a salt or acid form or low-capacity quaternary ammonium anion exchange resin in a salt form is contacted with an aqueous solution of the phenol to be sorbed. Advantageously, the aqueous phenol solution is fed to a water-wet bed of a salt form of the low-capacity quaternary ammonium anion exchange resin, preferably chloride or sulfate or of a salt or acid form of the low-capacity sulfonated cation exchange resin at a rate such that the phenol solute is substantially completely sorbed by the resin and is removed from the solution. The effluent liquor which is substantially free of phenol is drained away from the resin or is flushed therefrom with water. Preferably before phenol breakthrough, the resin is washed with a water-miscible saturated lower aliphatic alcohol, e.g., methanol, to remove the sorbed phenol from the resin. Thereafter, the cycle of operations is repeated. Two or more beds of resin may be operated in parallel so that one of the beds is being desorbed while the other bed is being used to sorb phenol from its aqueous solution. Flow of the aqueous solution or the water-miscible alcohol may be either up-flow or down-flow through the resin bed. The phenol may be separated from the alcohol solvent in usual ways, e.g., by distillation or crystallization. Alternatively, aqueous phenol solution is contacted with a water-wet low-capacity ion-exchange resin, as described above, until equilibrium is reached. The resin is then separated from residual liquor as by filtering and processed as above to de-sorb the phenol and regenerate the resin for re-use.

The following examples describe preferred embodiments and the best mode contemplated by the inventor for carrying out the invention. The examples are in illustration and not in limitation of the invention, which is defined in the claims.

EXAMPLE 1

A series of 6 quantities of low-capacity chloride form quaternary ammonium anion exchange resins having capacities of 2.35 and 1.15 meq./g., and a control, a conventional Dowex 1–X8 quaternary ammonium anion exchange resin in the chloride form having a capacity of 3.4 meq./g. and 6 quantities of low-capacity acid form sulfonated cation exchange resin with capacities of 3.02, 2.03, 0.76 and 0.56 meq./g. together with a control, a conventional Dowex 50–X8 sulfonated cation exchange resin in the acid form and having a capacity of 5.2 meq./g., all capacities being expressed on the dry resin weight basis, and the resins all being 200 to 400 mesh, were weighed into flasks. Known volumes of standard phenol solution were added, a different concentration for each flask, and the mixtures were equilibrated by standing for 20 hours at room temperature with occasional shaking. Portions of the solutions were then suitably diluted, and the phenol contents of the diluted solutions were determined by the colorimetric method described at Anal. Chem. 23:1783 (1951), using a Beckman DU spectrophotometer at 510 mμ.

The detailed data for the cation exchanger with a capacity of 0.56 meq. per g. are given in following Table I and the data for all the resins are summarized in following Table II.

*Table I.—Sorption of phenol by cation-exchange resin with a capacity of 0.56 meq. per g.*

| Run Number | 1 | 2 | 3 | 4 | 5 | 6 |
|---|---|---|---|---|---|---|
| Weight of Resin, g.=W | 0.987 | 0.989 | 0.992 | 0.995 | 1.51 | 3.00 |
| Volume of Phenol Soln., ml.=V | 100 | 100 | 100 | 100 | 125 | 250 |
| Concn. of Phenol, molarity Before Sorption=$M_0$ | 0.0912 | 0.00880 | 0.0000884 | 0.0000864 | 0.0000100 | 0.00000188 |
| After Sorption=$M_E$ | 0.0778 | 0.00764 | 0.000764 | 0.0000694 | 0.00000758 | 0.00000174 |
| Sorption, mmol.=$\psi = V(M_0-M_E)$ | 1.34 | 0.116 | 0.012 | 0.00170 | 0.00030 | 0.000035 |
| Sorption, mmol. per g.=$\theta = \psi/W$ | 1.36 | 0.117 | 0.0121 | 0.00171 | 0.000199 | 0.0000117 |
| Distribution Coefficient=$D = \theta/M_E$ | 17.5 | 15.3 | 15.8 | 24.6 | 26.2 | 6.72 |

*Table II.—Summary of sorption data*

| Resin | $M_E \times 10^3$ | $\theta$ | D |
|---|---|---|---|
| Dowex(R) 50–X8 0.56 meq./g. | 77.8 | 1,360 | 17.5 |
| | 7.64 | 117 | 15.3 |
| | 0.764 | 12.1 | 15.8 |
| | .0694 | 1.71 | 24.6 |
| | .00758 | 0.199 | 26.2 |
| | .00174 | .0117 | 6.72 |
| Dowex 50–X8 0.76 meq./g. | 86.0 | 1,190 | 13.8 |
| | 8.04 | 117 | 14.6 |
| | 0.777 | 15.9 | 20.5 |
| | .0692 | 1.94 | 28.0 |
| | .00750 | 0.232 | 30.0 |
| | .00100 | .0740 | 74.0 |
| Dowex 50–X8 2.03 meq./g. | 85.6 | 1,600 | 19 |
| | 7.02 | 292 | 41.6 |
| | 0.640 | 31.5 | 49.2 |
| | .0566 | 2.97 | 52.4 |
| | .00814 | 0.172 | 21.1 |
| | .00158 | .0317 | 20.1 |
| Dowex 50–X8 3.01 meq./g. | 83.7 | 1,230 | 14.7 |
| | 8.42 | 113 | 13.4 |
| | 0.818 | 15.8 | 19.3 |
| | .0758 | 2.24 | 29.6 |
| | .0102 | 0.126 | 12.4 |
| | .00212 | .0205 | 9.66 |
| Dowex 50–X8 5.2 meq./g. | 90.4 | 600 | 6.2 |
| | 8.82 | 70 | 8.0 |
| | 0.876 | 8.7 | 9.9 |
| | .0714 | 1.25 | 17.5 |
| | .00786 | 0.113 | 14.4 |
| | .00183 | .0093 | 5.08 |
| Dowex 1–X8 1.16 meq./g. | 76.2 | 2,370 | 31.1 |
| | 4.96 | 498 | 101 |
| | 0.280 | 65.7 | 235 |
| | .0224 | 8.5 | 379 |
| | .00316 | 0.732 | 231 |
| | .00091 | .0964 | 106 |
| Dowex 1–X8 2.30 meq./g. | 69.6 | 2,650 | 38.0 |
| | 5.52 | 417 | 75.5 |
| | 0.442 | 54.1 | 122 |
| | .0400 | 5.90 | 148 |
| | .00426 | 0.510 | 120 |
| | .00091 | .0954 | 105 |
| Dowex 1–X8 3.4 meq./g. | 73.2 | 2,900 | 40 |
| | 6.20 | 366 | 59.0 |
| | 0.512 | 47.7 | 100 |
| | .0494 | 4.45 | 90.1 |
| | .00454 | 0.463 | 102 |
| | .00136 | .0510 | 37.5 |

In the accompanying FIGURE 1, the sorption per gram of resin is plotted against the concentration of phenol at equilibrium on a log-log basis. The graphs of the two cation exchangers with the smallest capacities are omitted from this figure to avoid overcrowding.

Figure 2:
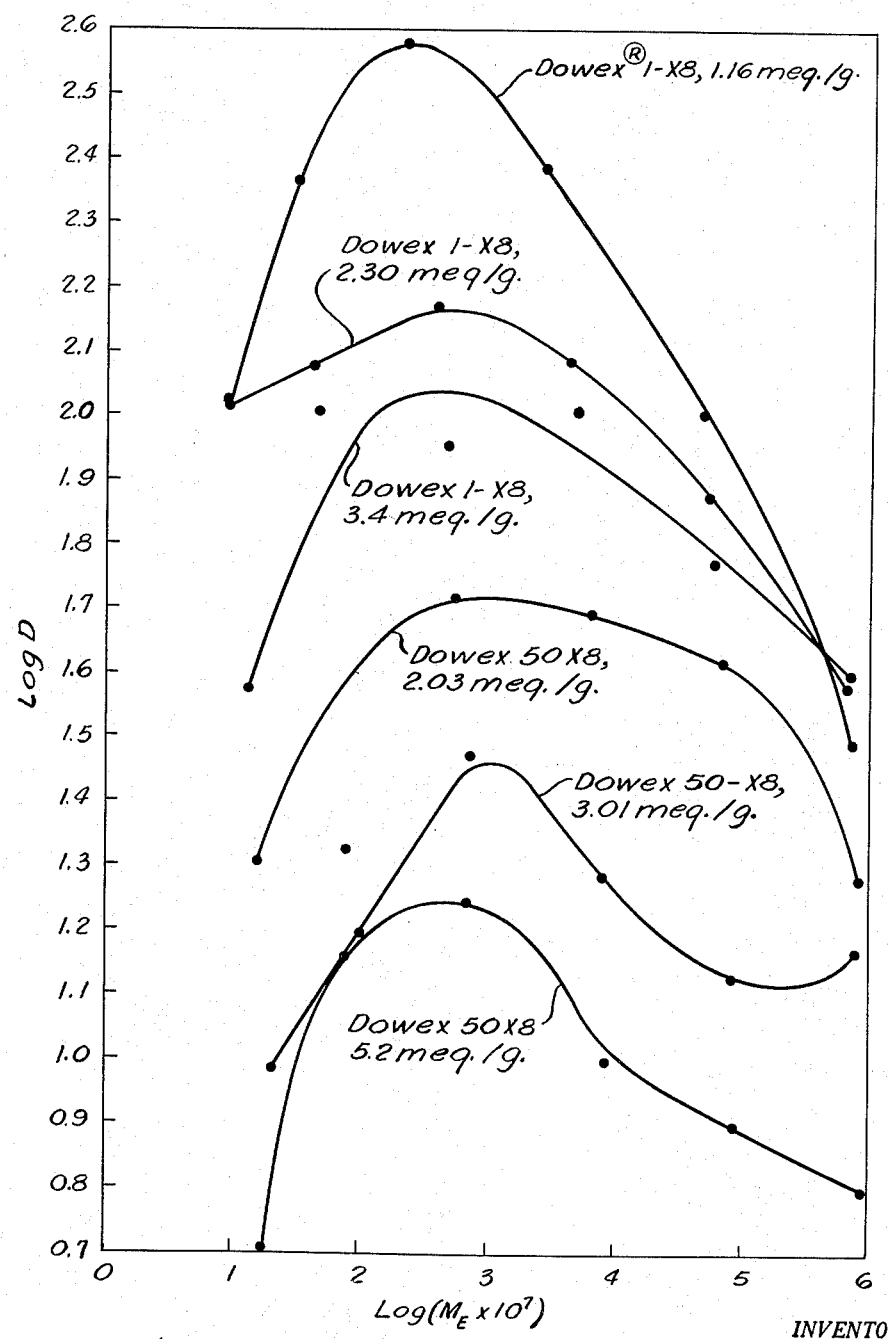

Accompanying FIGURE 2 presents plots of log D vs. log molarity of phenol where D is the distribution coefficient, i.e., the millimoles of phenol sorbed per g. of dry resin divided by the molarity of phenol. The decrease in sorption at very small concentrations and differences among the various resins are revealed more clearly here than in FIGURE 1.

EXAMPLE 2

An aqueous 100 p.p.m. 2,4,5-trichlorophenol solution containing 32 weight percent hydrogen chloride was fed to a bed of a 2 percent divinylbenzene cross-linked sulfonated polystyrene cation exchange resin in the acid form having a water content of 48.2 weight percent and a dry weight capacity of 1.5 meq./g.

After 40 bed volumes of effluent had been collected, the trichlorophenol concentration in the effluent was still less than 2 p.p.m. After 80 bed volumes of effluent had been collected, the trichlorophenol concentration therein had risen to 16 p.p.m. Thereafter the resin bed was regenerated.

The procedure of Example 2 when repeated with a low-capacity quaternary ammonium anion exchange resin in the chloride form having a capacity of 1.16 meq./g., dry basis, gives better sorption than can be obtained with the salt or acid form of low-capacity sulfonated cation exchange resins. This is in agreement with the observations that low-capacity quaternary ammonium anion exchange resins in the salt form, within the range claimed, have superior sorption as compared with low-capacity sulfonated cation exchange resins, within the range claimed.

The sorption of phenols with low-capacity resins of this invention does not follow the Freundlich equation.

What is claimed is:

1. A method for removing a phenol from an aqueous solution thereof by contacting said aqueous solution with a low-capacity member of the group of salt form quaternary ammonium anion exchange resins and salt and acid form sulfonated cation exchange resins, said resins having from 10 to 60 percent of their available nuclei substituted by a functional ion-exchanging group of the class consisting of quaternary ammonium salt and sulfonate groups, respectively, whereby the phenol is sorbed by the resin and is removed from the solution.

2. The method of claim 1 wherein the phenol is phenol.

3. The method of claim 1 wherein the phenol is 2,4,5-trichlorophenol.

4. The method of claim 1 wherein the low-capacity ion exchange resin is a quaternary ammonium anion exchange resin having from 10 to 60 percent of its available nuclei substituted by a quaternary ammonium salt group.

References Cited by the Examiner

UNITED STATES PATENTS

| 2,254,745 | 9/41 | Jannek | 260—627 X |
| 2,343,165 | 2/44 | Adler | 260—627 |
| 2,861,948 | 11/58 | McKellar | 260—621 X |
| 2,911,363 | 11/59 | Kissling | 260—621 X |
| 2,937,142 | 5/60 | Rios | 260—627 X |

OTHER REFERENCES

Bafna et al.: Ind. and Eng. Chem., 48:310–17 (1956), 8 pages.

LEON ZITVER, *Primary Examiner*.

CHARLES B. PARKER, *Examiner*.